FIG. 1.

No. 735,119. PATENTED AUG. 4, 1903.
F. M. LEAVITT.
PUNCH AND FEEDING MECHANISM.
APPLICATION FILED JUNE 4, 1902.
NO MODEL. 6 SHEETS—SHEET 4.

INVENTOR:
Frank M. Leavitt,
By Attorneys,

WITNESSES:

No. 735,119. PATENTED AUG. 4, 1903.
F. M. LEAVITT.
PUNCH AND FEEDING MECHANISM.
APPLICATION FILED JUNE 4, 1902.
NO MODEL. 6 SHEETS—SHEET 6.

FIG. 12.

WITNESSES:
René Bruine
Fred White

INVENTOR:
Frank M. Leavitt,

By Attorneys,

No. 735,119. Patented August 4, 1903.

UNITED STATES PATENT OFFICE.

FRANK M. LEAVITT, OF BROOKLYN, NEW YORK, ASSIGNOR TO E. W. BLISS COMPANY, OF BROOKLYN, NEW YORK, A CORPORATION OF WEST VIRGINIA.

PUNCH AND FEEDING MECHANISM.

SPECIFICATION forming part of Letters Patent No. 735,119, dated August 4, 1903.

Application filed June 4, 1902. Serial No. 110,153. (No model.)

*To all whom it may concern:*

Be it known that I, FRANK M. LEAVITT, a citizen of the United States, residing in the borough of Brooklyn, county of Kings, city and State of New York, have invented certain new and useful Improvements in Punches and Feeding Mechanism, of which the following is a specification.

My invention aims to provide certain improved devices for punching a number of articles from a sheet.

My improvement provides also certain improvements in feeding mechanism adapted to feed a sheet to one or more punches, dies, or the like.

Machines constructed in accordance with my invention are adapted for the use of larger-size sheets than are now in use in machines for similar purposes, whereby a considerable saving in the material of the sheet is accomplished.

The operation of the machine is extremely rapid, and the first cost is considerably below that of machines now in use for doing similar work.

Various other features of advantage are found in my invention, as specified in detail hereinafter.

The accompanying drawings illustrate an embodiment of the invention designed to be used in punching out can-heads from a sheet.

In machines at present in use for cutting can-heads or the like from a sheet it is usual to provide a gang of punches which simultaneously punch out a number of articles from the sheet. Two punches of a gang, however, cannot operate very close together simultaneously. In fact, in practice it is found best to separate them by a distance slightly greater than their own diameter and to punch out at a subsequent operation the portion of the sheet left vacant at the first operation. This sacrifices the chief advantage of a gang of punches, wasting much time while the operator moves the sheet to the new position necessary for the second punching. Even so, where two rows of punches are employed in one gang a considerable space between the two rows is usually lost. The first cost of these gang-punches is high, because the punches are the most expensive part of the mechanism. A further limitation on their usefulness is the fact that the gangs are never, in practice, made so large as to take the largest commercial sizes of tin sheets, these sheets being usually cut immediately in half and then fed to the punching-machine. This results in a considerable waste of material, because there is necessarily a certain portion of the sheet wasted at each edge, and a full sheet therefore wastes no more than a half-size sheet. Previous machines leave the scrap or remaining portion of the sheet whole, and because of its size and sharp edges it is a difficult thing to dispose of expeditiously.

My improved machine is practically unlimited as regards the size of sheet for which it can be adapted. In the embodiment of the invention shown the machine is adapted for sheets twice as large as those commonly employed in gang-punch machines; but the principle may be applied very easily on a much larger scale, if necessary, and with a correspondingly-increased saving of material.

An important feature of my invention is a mechanism for punching a number of articles in succession from a sheet, preferably providing also means for automatically stopping the mechanism after the punching of a determined number, or I may employ means for stopping the said mechanism at will, or I may employ (as in the machine illustrated) both means for automatically stopping the mechanism after a predetermined number of punchings and also means for stopping the mechanism at will. Preferably I employ a single punch or group of punches, which are stationary except for their punching movement, and I feed the sheet thereto by successive steps to punch the desired number of articles (or groups of articles) in succession from the sheet. The movement of the sheet relative to the punch is in both longitudinal and transverse directions, preferably the entire movement being in the sheet itself, as above stated. I secure the movement of the sheet in the shortest path by giving it longitudinal movement in successive alternating directions, so that it punches successive longitudinal rows of articles, and I economize material by arranging the articles of one row in positions longitudinally intermediate those of the next row. Preferably the movement of the sheet is accomplished by properly moving a sheet-carrier, which holds and moves with the sheet.

Another feature of advantage in my invention is the provision of means for cutting up the scrap or unused portion of the sheet. It is discharged from the machine in quite small bits, which run into a suitable receptacle and are easily handled. By the movement of the sheet it is fed first to the punch for cutting the desired articles from the sheet, and as it continues to move forward the unused portion is fed to one or more punches, which cut it up into small bits. Preferably the main punch and the cutting-up punch operate simultaneously, and the latter is in the natural path of the sheet after it passes from the main punch, so that there is no additional complication accompanying this feature of the invention.

Figure 8:
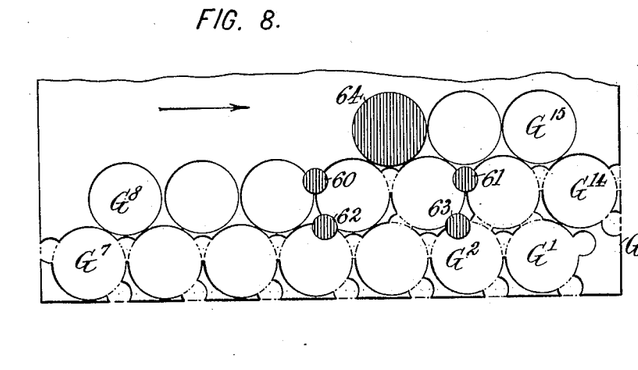
Fig. 8 is a plan of a sheet partly punched out.

Referring now to the machine illustrated in the accompanying drawings, I use the reference-letter A to indicate the punching mechanism as a whole, and B the feeding mechanism. These are preferably mounted in the relative positions shown on a frame C, supported at an adjustable angle on a base D, although any other suitable supporting-framework may be provided. The base E of the sheet-feeding mechanism is bolted to the frame C, as shown, and the sheet held thereon is moved longitudinally across the top of the base and downward to the punching mechanism, the punching operation commencing at the lower edge of the sheet and ending at the upper edge when the latter has reached its final position under the punch. The sheet is held by a carrier designated as a whole by the letter F, to which the machine directly imparts the necessary movements of the sheet, and when the sheet has been all punched out, the carrier being then in its lowest position, the carrier is drawn back to its original position in Fig. 2, a new sheet inserted therein, and the operation commenced again. The initial position of the sheet G is indicated by the portion shown in the upper part of Fig. 2. In this position the lower corner of the sheet is immediately under the punch, so that when the latter comes down it will punch out a can-head at the point $G'$, Fig. 8, the punch then rising and the carrier F moving a step forward in a longitudinal direction and carrying with it the sheet, when the punch comes down at the point $G^2$, Fig. 8. This step-by-step movement continues until the can-head $G^7$ is punched, when the carrier and sheet move transversely and at the same time obliquely, so that the next punch is at the point $G^8$. The carrier then moves in a longitudinal backward direction until the entire second row to $G^{14}$ has been punched out, when it moves transversely and obliquely to $G^{15}$ and forward again, &c., until the entire sheet is exhausted. The machine shown is designed to punch out six rows of seven can-heads each. Consequently the final position of the carrier will be transversely directly in line with its original position, which has certain advantages hereinafter described. The sheet-carrier has at its lower edge means for setting the sheet in the desired position and for engaging the sheet. An upwardly-projecting portion H of angular shape is arranged at one end to receive the corner of the sheet. A shaft J extends along the lower edge of the carrier and has arms K, provided on their under sides with sharp points, which engage the edge of the sheet and preferably pass through the same into suitable sockets in projecting portions L of the base-plate of the carrier. These portions L are pointed and are preferably arranged so that the engagement with the sheet is at points intermediate the positions at which the articles are to be punched, so that the sheet may be used up very close to its upper edge. The positions of the punchings of the last row are indicated in dotted lines in Fig. 2.

M is an arm arranged at any suitable point on the shaft J for turning the same to lift the arms K and release the sheet or enter a new sheet. Any suitable springs N are used for obtaining the desired pressure upon the engaging arms K.

Figure 7:
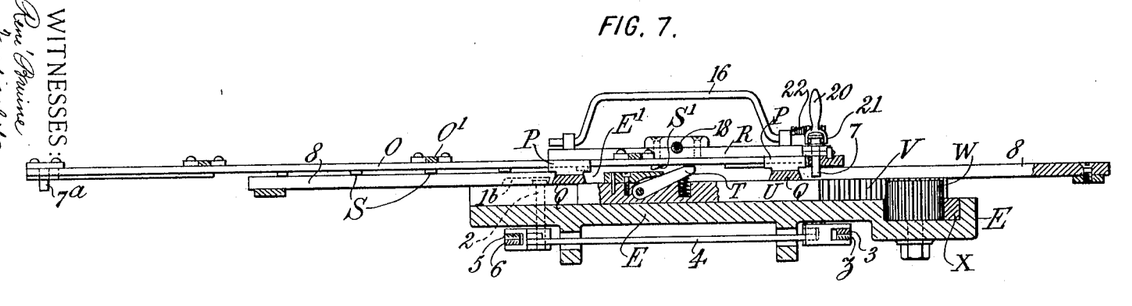
Fig. 7 is a section approximately on the line 6 6 of Fig. 2.

The rear portion of the sheet-carrier comprises a bar O, connected by cross-pieces $O'$ to the shaft J on the sheet-holding portion $O^2$, and preferably has beveled edges, as shown, and is arranged to slide in suitable guides, and thus to guide the carrier in its longitudinal movement. The guides P, in which the bar O slides longitudinally, are arranged at the upper end of a transversely-moving carriage comprising rack-bars Q, connected at their upper ends by means of a cross-bar R. The longitudinal movement of the bar O alternately backward and forward is obtained by providing the same on the under side with a series of teeth S, separated a distance equal to one longitudinal step of the sheet, and by providing a series of pawls T, operative in alternate directions and preferably all of which are constantly being reciprocated while the feeding mechanism is in operation, the bar O being moved in one longitudinal direction by the first of the pawls T step by step until it reaches the desired limit of longitudinal movement, whereupon the transversely-moving carriage moves down one step and brings the bar O into position for engaging with the next pawl T, which by its continual reciprocation moves the bar longitudinally step by step the desired distance in the opposite direction, this action being repeated as often as desired, six transverse movements being provided for in the machine shown. The tooth S', Fig. 7, is beveled at one side, so that after the carrier has moved to its final position the lowest pawl T may slide over the tooth, so as to avoid positive engagement therewith.

Figure 1:
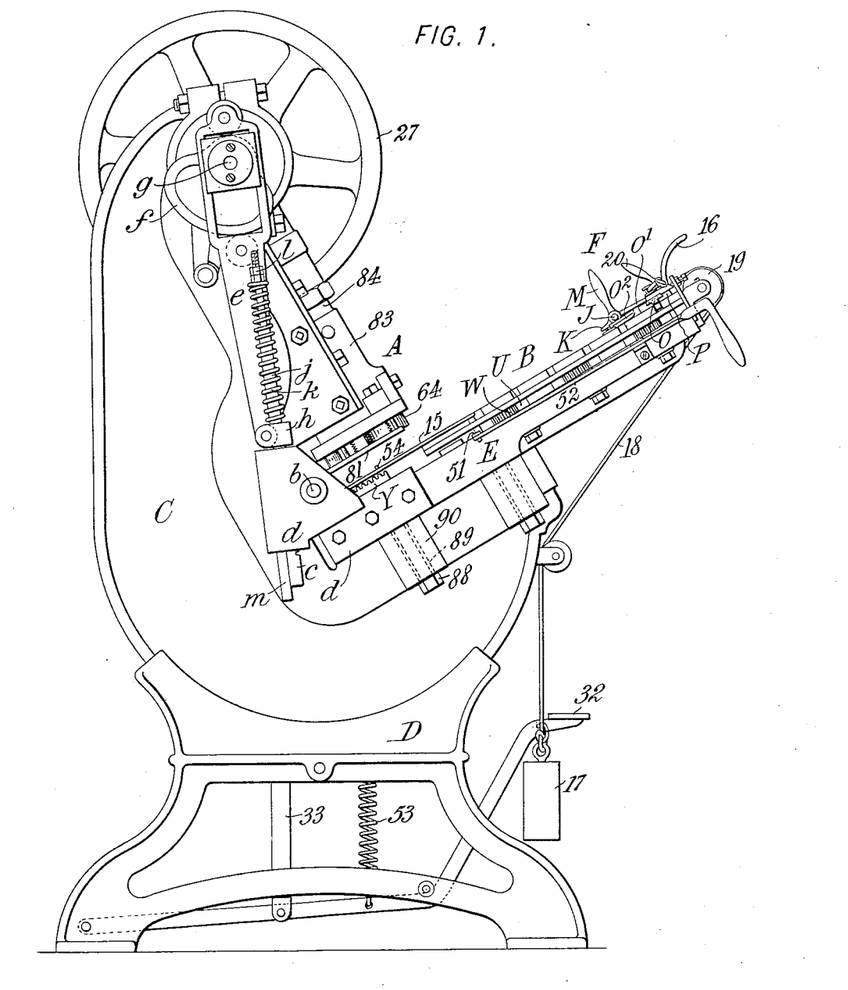
Figure 1 is a side elevation of the complete machine.
Figure 2:
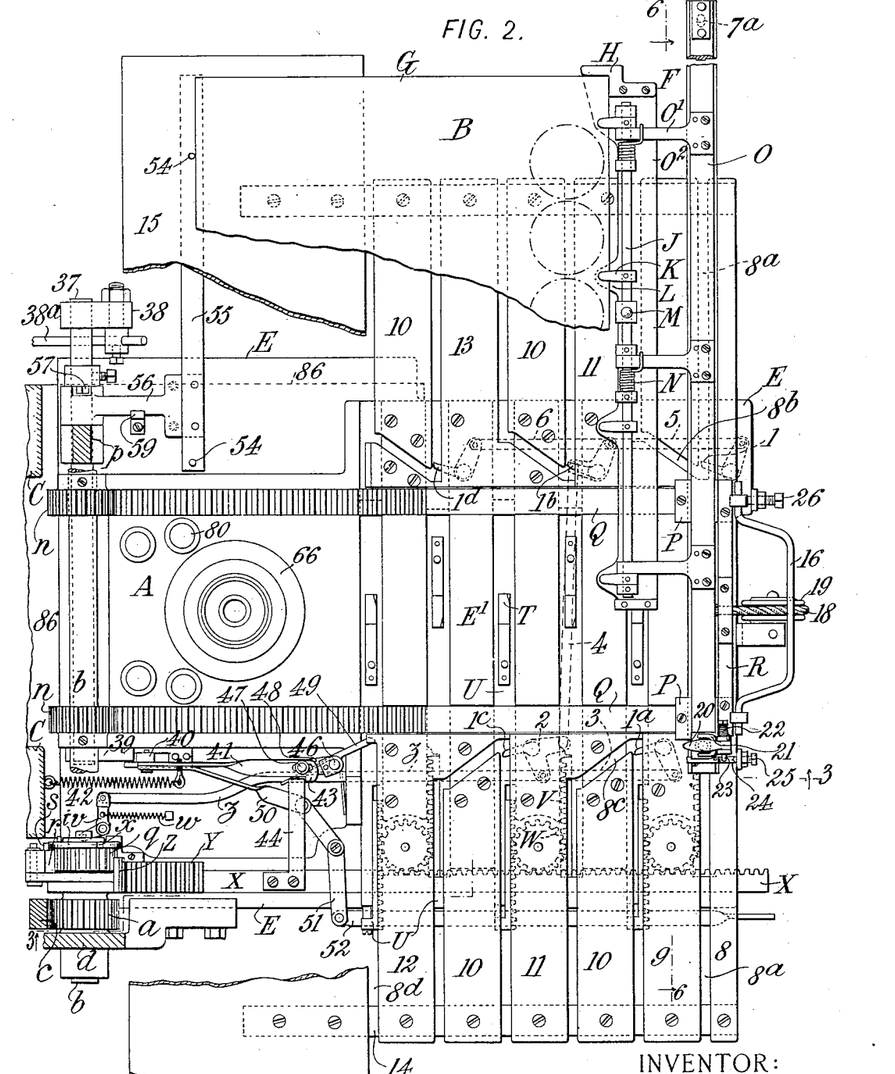
Fig. 2 is a plan of the feeding mechanism of Fig. 1.
Figures 3, 4, 5:
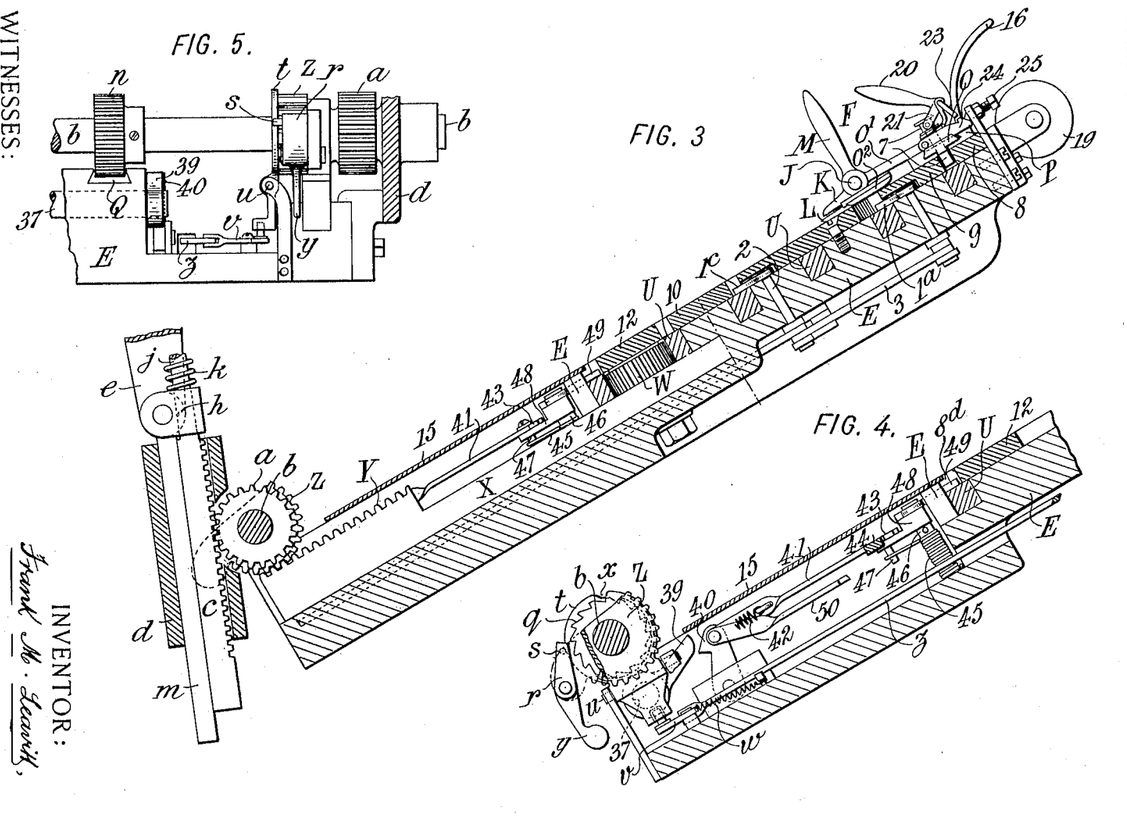
Figs. 3 and 4 are sectional views of certain parts of the mechanism of Fig. 2.
Fig. 5 is a side elevation of certain of the operating parts of the feeding mechanism.

The means which I have devised for securing the continual reciprocation of the pawls T are best illustrated in Figs. 1, 2, and 3. The pawls T are carried on longitudinal bars U, guided in suitable grooves formed in the base E of the feeding mechanism. These bars at one end carry racks V, arranged to face each other in pairs, as shown, and between each pair of racks is a pinion W, which is continually oscillated by a reciprocating rack-bar X, also guided in a groove in the base of the feeding mechanism, Fig. 7. The reciprocation of the bar X is produced by a rack Y at its lower end, with which engages a segmental gear Z, connected to or integral with a pinion $a$, which is mounted to rotate on a shaft $b$ and which is in turn engaged by a rack $c$, which is guided in a surrounding guide $d$ and which receives reciprocating movement from a rod $e$, operated by a cam $f$ on the main shaft $g$ of the machine. Preferably the rack-bar $c$ is yieldingly connected to the rod $e$, so that as the latter rises (this being the movement which propels the sheet) the rack-bar $c$, in case there should be any accidental stoppage of the feeding mechanism or in case the latter should have reached the limit of its movement, may remain stationary, the sleeve $h$, connected to the rod $e$, sliding upward on the extension $j$ of the rack-bar against the pressure of the spring $k$, which engages a nut $l$ at the upper end of the extension, this spring $k$ being ordinarily strong enough to effect the feeding movement under normal conditions. This sleeve $h$ is connected with a long arm $m$, which is guided in member $d$, so as to guide the sleeve $h$ properly on the extension $j$ and prevent transverse strains thereon.

The operating mechanism of the transversely-moving carriage is best shown in Figs. 2 to 7. The bars Q are guided in suitable grooves formed between upwardly-extending portions E' of the base E of the feeding mechanism and certain plates hereinafter referred to. The toothed lower portions of the bars Q are engaged by pinions $n$, fixed on the shaft $b$, which latter bears at one end in member $d$, Fig. 1, and at the opposite end in a bearing $p$, Fig. 12. The shaft $b$ is turned sufficiently to move the carriage a distance between two successive pawls T as soon as the sheet-carrier reaches the limit of each of its successive longitudinal movements. The shaft $b$ is normally stationary during the oscillation of the free pinion $a$, and its successive step-by-step movements are obtained by means of a ratchet-pinion $q$, keyed thereon, a pawl R, pivoted on an arm of the segmental gear Z, (which, as stated, is carried by the pinion $a$, mounted revolubly on the shaft $b$,) and a device in the nature of a clutch for throwing the pawl $r$ into engagement with the ratchet-pinion $q$ at proper intervals. The control of the pawl $r$ may be accomplished by providing the same with a laterally-projecting pin $s$, which ordinarily during the oscillation of the segment Z rides on the edge of a plate $t$ and holds the pawl out of engagement with the ratchet-pinion $q$. The plate $t$ is pivoted, as at $u$, Figs. 4 and 5, to permit it to swing out of reach of the pin $s$ and at its lower end is controlled by a horizontal lever $v$, which, by a spring $w$, tends normally to hold the plate $t$ in a position to render the pawl inoperative. As the sheet-carrier reaches the limit of its longitudinal movement in either direction the lever $v$ is pushed in the direction to throw the upper end of the plate $t$ out of the way of the pin $s$ and the pawl $r$ drops onto the ratchet-pinion $q$, and being at that moment in the retracted position, Fig. 4, moves forward and carries with it the pinion $q$ and the shaft $b$, and thus pulls the transversely-moving carriage one step downward, whereupon the lever $v$ is released and is pulled back by its spring $w$, throwing the plate $t$ to its normal position. The pin $s$ then enters a notch $x$, provided at a suitable point in the plate $t$, and in its subsequent oscillations rides on the edge of the plate $t$ and holds the pawl out of engagement with the ratchet. The pawl $r$ may be provided with a handle $y$ at the side opposite its pivot for hand manipulation of the same whenever necessary and as a weight to press the pawl against its ratchet.

Any suitable means may be provided for controlling the operation of the shaft $b$ and the transversely-moving carriage Q R. This means should operate to move the carriage one step in a transverse direction at the end of each longitudinal movement of the sheet-carrier F. In the machine illustrated the operation of the lever $v$, and consequently of the transversely-moving carriage, is produced by a rod $z$, which is thrust forward in the direction of the arrow, Fig. 2, at suitable intervals and which is immediately released to permit the spring $w$ to throw the lever $b$ in the opposite direction. For the purpose of operating the rod $z$ it is operatively connected to a series of arms 1 $1^a$ $1^b$ $1^c$ $1^d$, which arms are struck by a projection on the under side of the bar O of the sheet-carrier, hereinafter described. The rod $z$ is connected to the arm $1^c$, preferably by being joined to a lower arm on the same vertical shaft 2 which carries the arm $1^c$. The other arms 1, $1^a$, $1^b$, and $1^d$ are mounted on similar upright shafts 2, which carry arms at their lower ends which are connected by links 3, 4, 5, and 6, so that no matter which arm is operated by the carrier the transverse carriage is moved a step forward.

For operating the arms 1 $1^a$, &c., a pair of pins 7 and $7^a$ may be provided on the under side of the bar O, one being, as shown, stationary and the other removable for a purpose which will appear hereinafter. The upper face of the feed-table is provided with a series of grooves in which the projecting pins 7 and $7^a$ move, whereby the bar O is properly guided and whereby also the pins are properly guided to engage the arms $1^a$, &c. The desired construction is preferably obtained, as illustrated, by mounting on the upper face of the base-plate E of the feeding mechanism a series of plates 8, 9, 10, 11, 12, and 13 of the shapes shown or of any other suitable shapes spaced apart to form grooves in which the pins 7 and $7^a$ are guided. At their inner edges these plates form the outer sides of the grooves in which the bars Q of the transversely-moving carriage run. The outer ends of these plates are extended beyond the bed-plate and are preferably connected by means of a transverse bar 14, which in turn preferably supports a larger plate 15 at the lower side of the feeding mechanism. The narrow plates 8, 9, 10, 11, 12, and 13 and the wide plate 15 form, in effect, the upper face of the feed-table, upon which the sheet is supported as it moves to and fro. The pin 7 travels in the grooves between the plates 8, 9, 10, 11, and 12 at one side of the table and the pin $7^a$ travels in the grooves between the corresponding plates 8, 9, 10, 11, and 13 at the other side of the table. Starting from the position of Fig. 2, as the bar O is moved longitudinally the pin $7^a$ after a time enters the groove $8^a$ and travels therein until it strikes the arm 1. Immediately the clutch $t$ is thrown into operation and the pinion $q$, shaft $b$, and transversely-moving carriage Q R are moved a step forward. The bar O therefore moves transversely one step, and at the same time the pin $7^a$, being guided in the oblique groove $8^b$, carries the sheet one step transversely and half the length of one step longitudinally, so that the next punching will be at a point longitudinally intermediate between two punchings in the first row. This movement corresponds with the movement from the position $G^7$ to the position $G^8$ in Fig. 8. The pin $7^a$ then travels along the next longitudinal groove, and toward the end of the longitudinal movement the pin 7 enters this second groove at the opposite side of the machine, and as the movement is continued to the end strikes the arm $1^a$, whereupon the transverse movement is repeated and the carriage is given at the same time an oblique movement, by means of the groove $8^c$, in a direction longitudinally opposite that produced by the groove $8^b$. This movement corresponds to that from the position $G^{14}$ to the position $G^{15}$ in Fig. 8. The movement is continued alternately longitudinally and transversely until at the end of the final longitudinal movement the pin 7 enters the groove $8^d$ between the plate 12 and the plate 15 and, instead of producing a transverse movement, trips a lever and, as hereinafter described, unclutches the mechanism from the driving power. It is at this point that the feature of movability of the pin 7 is of advantage. By merely lifting the pin 7 above the level of the face of the feed-table the operator, taking hold of handle 16, lifts the transversely-moving carriage Q R, and with it the longitudinal sheet-carrier F, by a short direct path to their original position, Fig. 2, at which point the pin 7 is released and enters the top groove $8^a$ for a succeeding movement, serving also to prevent premature downward movement of the transversely-moving carriage. It is understood that at all periods of the operation either the pin 7 or the pin $7^a$ is in one of the longitudinal slots between the face-plates for this purpose. As indicated in Fig. 7, before the pin 7 passes beyond the outer end of the plate 8 at one side of the table the pin $7^a$ passes within the outer end of the corresponding plate at the opposite side of the table. The lifting of the carriage from its final to its original position is made easier by a counterbalancing-weight 17, Fig. 1, which is preferably connected by a cable 18, running over a pulley 19 to the cross-bar R of the carriage Q R. This counterweight should preferably hold the carriage, so that it will not move downward except under the action of the pinions $n$ and will not move upward except under the pull of the operator. The movement of the pin 7 may be conveniently accomplished by means of a small hand-lever 20, suitably pivoted on the longitudinal bar O and operating an arm 21, which engages the upper end of the pin 7 to lift it, but which is normally pressed downward by means of a spring 22, Figs. 2 and 7. When the lever 20 is pulled to lift the pin 7, a second arm 23, connected thereto, is caught by a pawl 24, so as to hold the pin up against the action of the spring 22, so that the operator may have his hands free to draw up the carriage. As the carriage reaches its uppermost position the pawl 24 strikes a retracting member 25, (see especially Fig. 3,) fixed to the upper edge of the base-plate, and is retracted, whereupon the spring 22 is free to return the pin 7 to its downward position. The operator then starts the machine, which repeats the operations previously described. Preferably an additional adjustable stop 26, Fig. 2, is provided, which is struck by a portion of the carriage Q R and determines the limit of the upward movement of the carriage. The operator standing at the edge of the machine (at the right in Fig. 2) is always a considerable distance from the punch and performs his manipulations only when the punch is stationary, so that he is very safe from accidental injury by the punch.

Figure 6:
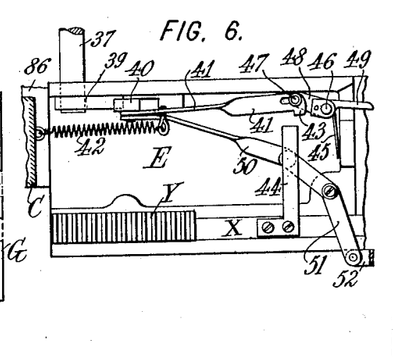
Fig. 6 is a view of certain parts of Fig. 2 in another position.
Figure 12:
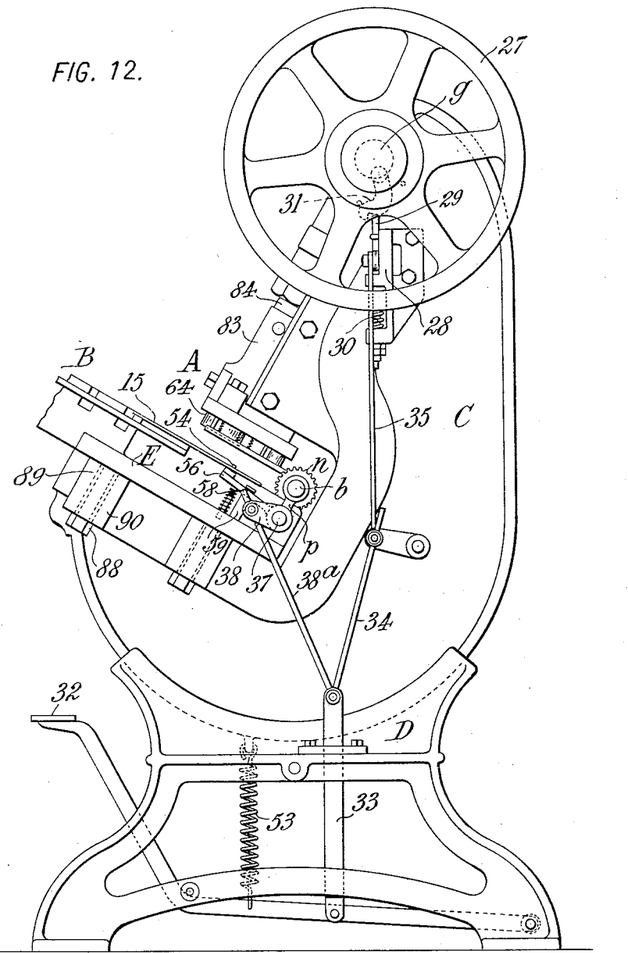
Fig. 12 is a side elevation of the opposite side of the machine from that shown in Fig. 1.

The controlling mechanism is illustrated especially in Figs. 12 and 2. The main shaft $g$, which drives the punch and also the feeding mechanism, is driven from a continuously-moving pulley 27. Any suitable form of intermittent clutch 28 is provided whereby the pulley is clutched to the shaft and after driving the same for a determined distance is unclutched. Various clutches of this type are well known, and I have shown a common form of one-revolution clutch in which the clutching action is produced by pulling downward a stop 29, which is normally pressed upward by a spring 30 into the path of an arm 31 on a clutch-key between the driving-pulley 27 and the shaft $g$, so that as long as the stop 29 is held down the clutch remains operative, but which as soon as it is released moves upward to engage the arm 31 and to render the clutch inoperative as soon as the arm 31 engages with the stop. The stop 29 is preferably operated by a pedal 32, which is connected thereto by means of a series of connecting-rods 33 34 35, 34 and 35 being connected by means of a swinging arm, as illustrated in Fig. 12, in order to secure the desired direction of movement of the rod 35. Means are preferably provided for retaining the clutch in operation after it has been set in operation by the action of the pedal, the means shown for this purpose consisting of a rock-shaft 37, connected by an arm 38 to the rod $38^a$ and carrying at its opposite end an arm 39, Figs. 2, 4, and 6, which when it moves downward is caught and held by a pawl 40. Therefore when the operator presses down on the pedal 32 the clutch is thrown into operation and retained in operation. At a predetermined time (in the present case at the end of the entire feeding movement) the clutch is freed, preferably by withdrawing the retaining-pawl 40, which permits the stop 29 of the clutch to move upward into the path of the arm 31 and throw the clutch out of operation, as explained. The means for freeing the clutch from the retaining action of the pawl 40 at a predetermined time is best illustrated in Figs. 2, 3, 4, and 6. At the upper end of the pawl 40 there is connected a rod 41, to which is connected a spring 42, tending to draw it always forward to hold the pawl in its retaining position upon the arm 39. Means as follows are then provided for drawing back the rod 41 against the stress of the spring 42 when the last head has been punched from the sheet. The end of the rod 41 opposite the pawl is provided with a shoulder 43, which is normally held out of the path of an arm 44, carried on the constantly-reciprocating rack-bar X, by means of a coiled spring 45 on a short vertical shaft 46, which at one end bears against a pin 47, projecting from the under side of the rod 41. The shaft 46 carries also an arm 48, engaging the pin 47 and connected to another arm 49, which when the shoulder 43 is out of the path of the arm 44 extends across the inner portion of the groove $8^d$ into the path of the pin 7 on the under side of the sheet-carrier. Fig. 2 shows the position of the parts when the retaining-pawl 40 has been thrown off the arm 39 and the main clutch has been rendered inoperative, so that the machine has stopped and the sheet-carrier has been drawn up to its starting position. Fig. 6 shows the parts in the position assumed during operation. To start the machine, the operator, pressing the pedal 32, throws the clutch into operation, as explained, and throws down the arm 39 of the shaft 37. The action of the punch and of the feeding mechanism commences, and before the main shaft has rotated to such a point as to throw the clutch out of operation the rack-bar X has moved to withdraw the arm 44 from against the shoulder 43. Previously the friction due to the pull of the spring 42 holds the shoulder 43 from being moved outward from beyond the end of the arm 44; but when the arm 44 is drawn downward the shoulder 43 is released, and the rod 41 is thrown toward the center of the machine and out of the path of the arm 44 by means of the coiled spring 45, whereupon the spring 42 draws the pawl 40 forward and holds it in position over the end of the arm 39 on the controlling shaft of the clutch, and the machine continues to operate until the pawl 40 is again withdrawn. Preferably means are provided also for withdrawing the retaining means, so as to free the clutch at will at any point in the operation of the machine. This means may be, for example, a rod 50, connected to the end of the pawl 40 and normally drawn forward under the influence of the spring 42, but adapted to be withdrawn at will by means of a lever 51, operated by a rod 52, extending along the side of the machine to the upper edge thereof, so as to be within reach of the operator. By pushing the rod 52 the operator pulls the rod 50 and withdraws the retaining-pawl 40, leaving the clutch in position to free the main shaft $g$ as soon as the latter has reached the necessary point in its rotation. A spring 53, Fig. 12, is preferably used in order to take up the weight of the connections to the clutch and cause the same to operate as soon as the retaining-pawl is withdrawn.

A gage for the lower edge of the sheet may also be provided, consisting, preferably, of a pair of pins 54, projecting upward through the face-plate 15 of the feed-table when the machine is out of operation and withdrawn below the face by the act of starting the machine and retained below the face, so as not to interfere with the downward movement of the sheet during operation. These pins may, for example, be carried on a bar 55, which is mounted on an arm 56, which is pivoted on the controlling-shaft 37 and which is given a slight upward and downward movement by the oscillation of the shaft 37 through a lost-motion connection between the hub of the arm 56 and a pin 57, Fig. 2, mounted on the shaft 37. A spring 58, Fig. 12, presses the arm 56 normally upward, and a stop 59 prevents too-great upward movement.

Figures 9, 10:
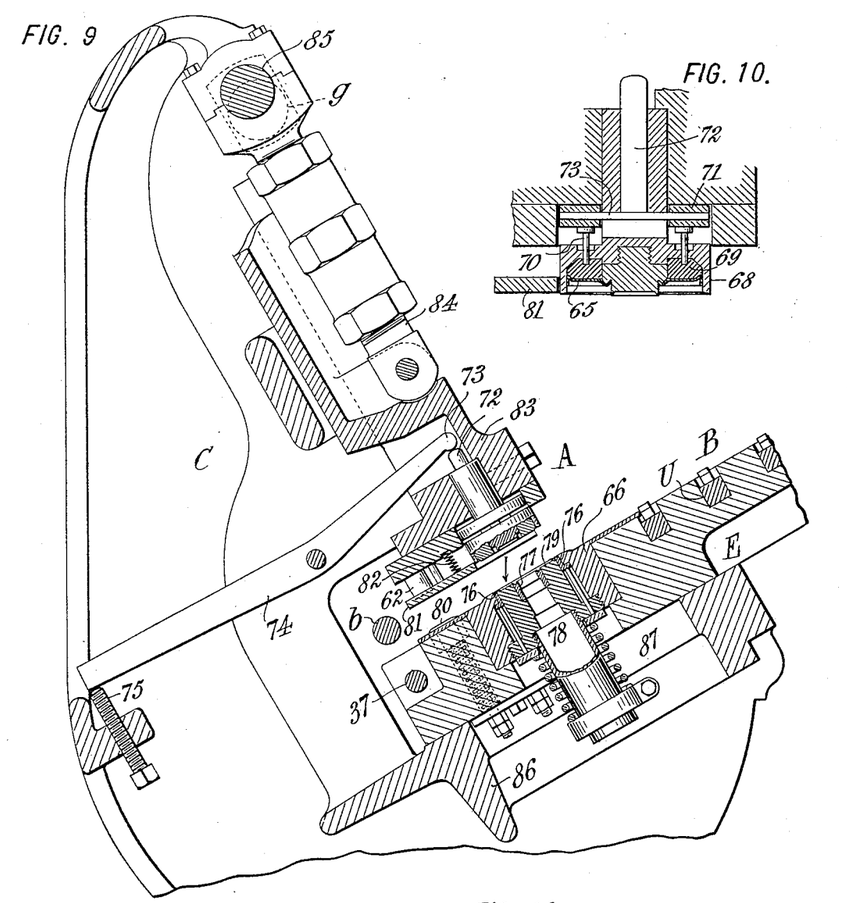
Fig. 9 is a vertical section of the punch-operating mechanism.
Figs. 10 and 11 are central vertical sections of the punch proper, showing the same in different positions.

My invention also provides, as stated, certain novel features in the punching mechanism independently of the particular feeding mechanism used. Besides the means for cutting articles from a sheet I may provide also means for cutting up the remaining portion of the sheet, these parts being preferably arranged as illustrated in the accompanying drawings, in which the articles are cut in succession from the sheet, and the means for cutting up the remaining portion of the sheet acts simultaneously with the other cutting means. As shown in Figs. 2, 8, 9, 10, and 11, cutting-up punches 60, 61, 62, and 63 are arranged transversely rearward of the main punch 64, so that the sheet is fed first to the main punch and then to the cutting-up punches. The cutting-up punches 60 and 61 act to cut the transverse webs remaining between longitudinally-adjacent holes. These punches are arranged as near the upper edge of the row upon which they act as possible. They separate from the uncut portion of the sheet all the previously-cut rows. For this purpose one such punch placed immediately in line transversely with the main punch 64 might be made to do the work; but I am enabled to place the punches 60 and 61 higher up by offsetting them from the main punch 64, and I leave also a clear space through which the cut-out article may be discharged, as hereinafter explained. With one of the punches 60 61 at each side of the main punch 64 the complete separation of the lower from the upper portion of the sheet is effected, one of the cutting-up punches acting in advance of the main punch in whatever direction the sheet may be moving. For example, in the direction of motion shown in Fig. 8 the punch 60 acts always in advance of the main punch 64. For cutting the horizontal webs which remain between adjacent rows of holes the lower punches 62 and 63 are used, being positioned as indicated, so that each will cut at a different point and will cut the scrap up into very small pieces. The inclination of the table is also availed of for the purpose of discharging can-heads or similar articles cut from the sheet. For this purpose the main punch is so arranged that in its upward movement it carries with it the cut-out article to a determined distance above the table, at which point it ejects the article, which then drops vertically clear of the die and slides over the sheet and the scrap and between the pairs of cutting-up punches off the lower edge of the table, at which point any suitable means may be provided for separating the articles from the small pieces of scrap. The vertical arrow in Fig. 9 shows the movement of the cut-out article.

Figure 11:
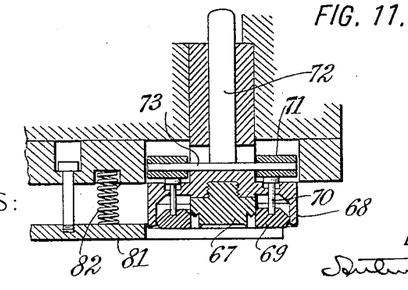

The punch of course may be varied considerably, depending on the nature of the articles to be cut. The punch which I have shown in Figs. 9, 10, and 11 is especially designed for cutting out a can-head 65 of the shape shown in connection with Fig. 10, the die 66 being suitably shaped to correspond with the punch. The concentric cutting portions 67 and 68 are united to move together and to cut the annular can-head shown, and between the cutting portions is arranged the annular ejector 69, which is connected by pins 70 to a ring 71, surrounding the upper portion of the punch. The ring 71 in turn is connected to a pin 72 by a cross-pin 73, working in a vertical slot in the punch, the pin 72 projecting, as shown in Fig. 9, upward above the punch and the surrounding portion of the slide which operates the punch. When the punch is pressed down and cuts out the can-head, the annular ejector 69 is forced up in the punch, Fig. 10, and is held there by the can-head, which is picked up with the punch by reason of its frictional engagement with the cutting portions of the punch. As the punch then rises it carries the can-head with it until the pin 72 strikes a stop 73, which is preferably adjustable by being formed at the end of a lever 74, which bears at its opposite end on an adjustable support 75, carried by the frame of the machine. The ejector 69 is then forced downward to eject the can-head, which drops, as explained, and slides off the face of the table and out of the way of the cutting-up punches. The die will in each case be designed to suit the article to be punched out and to match the punch. The die 66 in the construction illustrated is provided with a yielding ring to permit the pressing down of the flange of the can-head and with cutting edges 76 and 77. A passage 78 is provided for the discharge of the portion cut out from the center of the can-head. The fixed portion 79, between the cutting edges, has a suitably-shaped annular face for providing the desired grooves in the can-head. The dies 80 for the cutting-up punches are provided with yielding plungers, which when the punches are lifted eject the portions of scrap cut from the sheet. The sheet is pressed down against the die before being engaged by the punches, preferably by means of a presser-plate 81, which is preferably in a single piece surrounding the entire group of dies and guided thereon, so as to avoid lateral movement, and which is pressed downward by means of a series of springs 82 at suitable points, so that it normally stands, as shown in Fig. 9, with its lower edge a short distance below the lower faces of the punches. When the punches are lifted, the springs 82 hold the plate 81 down against the sheet long enough to strip the sheet from the outer faces of the punches.

The reciprocation of the punch may be accomplished by any desired means. For example, the punch may be set in a slide 83, moving in suitable guides at the edge of the main frame C and operated by a connecting-rod 84 from a crank 85 on the main shaft $g$. The punch therefore makes one reciprocation for each revolution of the shaft $g$, and the clutch which controls the operation of the shaft is arranged to free the shaft from the driving-pulley only at the end of a complete revolution, which carries the punch to its raised position.

The main frame C of the machine is preferably composed of a pair of upright side portions, as indicated at the left in Fig. 2, suitably reinforced at the edges.

For supporting the base-plate E of the feeding mechanism a heavy web or bolster 86, Figs. 2 and 9, is provided, in the central portion of which is an opening 87 to provide room for the lower projecting portions of the dies. The base-plate E is fastened down upon the frame by means of bolts 88, passing through transversely-elongated slots 89 in lugs 90 at the sides of the frame, which permit a slight lateral adjustment of the feed-table.

Though I have described with great particularity of detail a machine embodying the several features of improvement which my invention introduces, yet it is to be understood that the invention is not restricted to the particular embodiment disclosed. Various modifications or omissions of the details, arrangements, and combinations of parts thereof may be made by those skilled in the art without departure from the invention.

I claim as my invention—

1. In a can-head machine, the combination of mechanism for punching a determined number of can-heads in succession out of a sheet, and means for then automatically stopping said mechanism.

2. In a can-head machine, the combination of mechanism for punching a determined number of can-heads in succession out of a sheet, means for then automatically stopping said mechanism, and means for stopping said mechanism at will.

3. In a can-head machine, the combination with a punch, of means for moving a sheet relatively thereto, mechanism for operating said parts to punch a number of can-heads in succession out of said sheet, and mechanism controlled by said sheet-moving means for stopping said operating mechanism.

4. In a can-head machine, the combination with a punch, of means for moving a sheet relatively thereto, mechanism for operating said parts to punch a determined number of can-heads in succession out of said sheet, and means for then automatically stopping said mechanism.

5. In a can-head machine, the combination with a punch, of means for moving a sheet relatively thereto, mechanism for operating said parts to punch a determined number of can-heads in succession out of said sheet, means for then automatically stopping said mechanism, and means for stopping said mechanism at will.

6. The combination with a punch, of means for moving a sheet relatively thereto, mechanism for operating said parts, an intermittent one-revolution clutch controlling the driving of said mechanism, means for throwing said clutch into operation, and means for automatically retaining said clutch in continuous operation.

7. The combination with a punch, of means for moving a sheet relatively thereto, mechanism for operating said parts, an intermittent one-revolution clutch controlling the driving of said mechanism, means for throwing said clutch into operation, means for automatically retaining said clutch in continuous operation, and means for automatically freeing said clutch from said retaining means at a predetermined time.

8. The combination with a punch, of means for moving a sheet relatively thereto, mechanism for operating said parts, an intermittent one-revolution clutch controlling the driving of said mechanism, means for throwing said clutch into operation, means for automatically retaining said clutch in continuous operation, and means for freeing said clutch from said retaining means at will.

9. The combination with a punch, of means for moving a sheet relatively thereto, mechanism for operating said parts, an intermittent one-revolution clutch controlling the driving of said mechanism, means for throwing said clutch into operation, means for automatically retaining said clutch in continuous operation, means for automatically freeing said clutch from said retaining means at a predetermined time, and means for freeing said clutch from said retaining means at will.

10. The combination with a punch, of means for moving a sheet relatively thereto, mechanism for operating said parts, an intermittent clutch controlling the driving of said mechanism, a rock-shaft connected to said clutch, an arm on said rock-shaft, and a retaining-pawl adapted to engage said arm when said clutch is thrown into operation.

11. The combination with a punch, of means for moving a sheet relatively thereto, mechanism for operating said parts, an intermittent clutch controlling the driving of said mechanism, a rock-shaft connected to said clutch, an arm on said rock-shaft, a retaining-pawl adapted to engage said arm when said clutch is thrown into operation, and means for withdrawing said retaining-pawl at a predetermined time.

12. The combination with a punch, of means for moving a sheet relatively thereto, mechanism for operating said parts, an intermittent clutch controlling the driving of said mechanism, a rock-shaft connected to said clutch, an arm on said rock-shaft, a retaining-pawl adapted to engage said arm when said clutch is thrown into operation, and means for withdrawing said retaining-pawl at will.

13. The combination with a punch, of means for moving a sheet relatively thereto, mechanism for operating said parts, an intermittent clutch controlling the driving of said mechanism, a rock-shaft connected to said clutch, an arm on said rock-shaft, a retaining-pawl adapted to engage said arm when said clutch is thrown into operation, means for withdrawing said retaining-pawl at a predetermined time, and means for withdrawing the same at will.

14. The combination with a punch, of means for moving a sheet relatively thereto, mechanism for operating said parts to punch a number of articles in succession from said sheet, a gage for setting said sheet in proper initial position, and means for withdrawing said gage on starting said mechanism and holding it withdrawn during the punching of said number of articles.

15. The combination with a punch, of means for moving a sheet relatively thereto, mechanism including a clutch for operating said parts to punch a number of articles in succession, a retaining-pawl adapted to retain said clutch in operative position, means tending normally to move said pawl to its retaining position, and means for automatically withdrawing said pawl from its retaining position at a determined point in the movement of said sheet.

16. The combination with a punch, of means for moving a sheet relatively thereto, mechanism for operating said parts, a retaining-pawl adapted to retain said mechanism in operation, a rod connected to said pawl and having a shoulder, a member constantly reciprocating while said mechanism is in operation and adapted to engage said shoulder to withdraw said pawl from its retaining position, means normally holding said rod with its shoulder out of the path of said constantly-reciprocating member, and means for moving said rod into position to be engaged by said constantly-reciprocating member at a determined point in the movement of said sheet.

17. The combination with a punch, of a sheet-carrier, means for moving the same forward a plurality of steps to permit the punching of a number of articles in succession from a sheet, and means for automatically stopping the same at the end of a predetermined number of steps.

18. The combination with a punch, of a sheet-carrier, means for moving the same forward a plurality of steps to permit the punching of a number of articles in succession from a sheet, means for automatically stopping the same at the end of a predetermined number of steps, and means for stopping the same at will.

19. In a sheet-feeding mechanism, the combination with a sheet-carrier, of a plurality of reciprocating pawls operating in opposite directions, and means for transferring said carrier to positions in which it is adapted for engagement with each of said pawls in succession.

20. In a sheet-feeding mechanism, the combination with a sheet-carrier, of a plurality of reciprocating pawls operating in opposite longitudinal directions, a transversely-movable carriage in which said sheet-carrier is longitudinally movable, and means for moving said carriage to bring said sheet-carrier to positions in which it is adapted for engagement with each of said pawls in succession.

21. In a sheet-feeding mechanism, the combination with a sheet-carrier, of a plurality of reciprocating pawls operating in opposite longitudinal directions, a transversely-movable carriage in which said sheet-carrier is longitudinally movable, means for moving said carriage to bring said sheet-carrier to positions in which it is adapted for engagement with each of said pawls in succession, and mechanism for setting the carriage-moving means in operation upon the termination of a longitudinal movement of said sheet-carrier.

22. In a sheet-feeding mechanism, the combination with a grooved base, of a sheet-carrier, means for moving the same over said base, and a projection on said carrier normally entering the groove of said base, said groove being crooked and said projection being adapted to be withdrawn to permit the return of said carrier directly to its original position.

23. In a sheet-feeding mechanism, the combination with a grooved base, of a sheet-carrier, means for moving the same over said base, a projection on said carrier normally entering the groove of said base, said groove being crooked and said projection being adapted to be withdrawn to permit the return of said carrier directly to its original position, and means for returning said projection to its normal position on the return of said carrier to its original position.

24. In a can-head machine, the combination with a punch, of means for moving a sheet relatively thereto and in longitudinal and transverse directions, mechanism for operating said parts to punch a determined number of can-heads in succession out of said sheet, and means for then automatically stopping said mechanism.

25. In a can-head machine, the combination with a punch, of means for moving a sheet relatively thereto and in longitudinal and transverse directions, mechanism for operating said parts to punch a determined number of can-heads in succession out of said sheet, means for then automatically stopping said mechanism, and means for stopping said mechanism at will.

26. In a can-head machine, the combination with a punch, of means for feeding a sheet thereto, mechanism for operating said parts to punch a determined number of can-heads out of said sheet, and a controlling device for said operating mechanism, said feeding means including a sheet-carrier, means for moving the same, and a projection on said carrier adapted to engage said controlling device to stop said mechanism.

27. In a sheet-feeding mechanism, the combination of an inclined table, a sheet-carrier adapted to move downward on said table, and a counterbalance for said sheet-carrier.

28. The combination with means for cutting articles from a sheet, leaving longitudinal and transverse webs uncut in the remaining portion of the sheet, of means for cutting both such longitudinal and such transverse webs to reduce the scrap to small pieces easily disposed of.

29. The combination with an inclined discharge-table, of means for cutting out articles from a sheet and discharging them on said table, means for feeding a sheet to said cutting-out means and over said discharge-table, and means for cutting up the remaining portion of said sheet in advance of the cut-out articles to avoid interference with the movement of the cut-out articles over said table.

30. The combination with a punch for cutting articles from a sheet, of means for feeding the sheet continuously forward and in alternate lateral directions, and a pair of cutters in rear of said punch and at opposite sides thereof so that one cutter is in advance of the punch in whatever lateral direction the sheet is fed.

31. A punch adapted to punch out an article from a sheet and to engage and hold the article punched so as to pick it up from the die.

32. The combination with a punch adapted to punch out an article from a sheet and to engage and hold the article punched so as to pick it up from the die, of means for ejecting the same.

33. The combination with a punch acting in an inclined direction and adapted to punch out an article from a sheet and to engage and hold the article punched so as to pick it up from the die, of means for ejecting the same after the punch has moved upward.

34. The combination in a reciprocating punch, of a pair of concentric cutting portions adapted to engage and hold between them the article punched so as to pick it up from the die, an annular ejector between said cutting portions, and means for operating said ejector after the punch has moved upward.

In witness whereof I have hereunto signed my name in the presence of two subscribing witnesses.

FRANK M. LEAVITT.

Witnesses:
 FRED WHITE,
 THOMAS F. WALLACE.